(No Model.)
H. C. GOODRICH.
WHEEL.
No. 456,218.          Patented July 21, 1891.
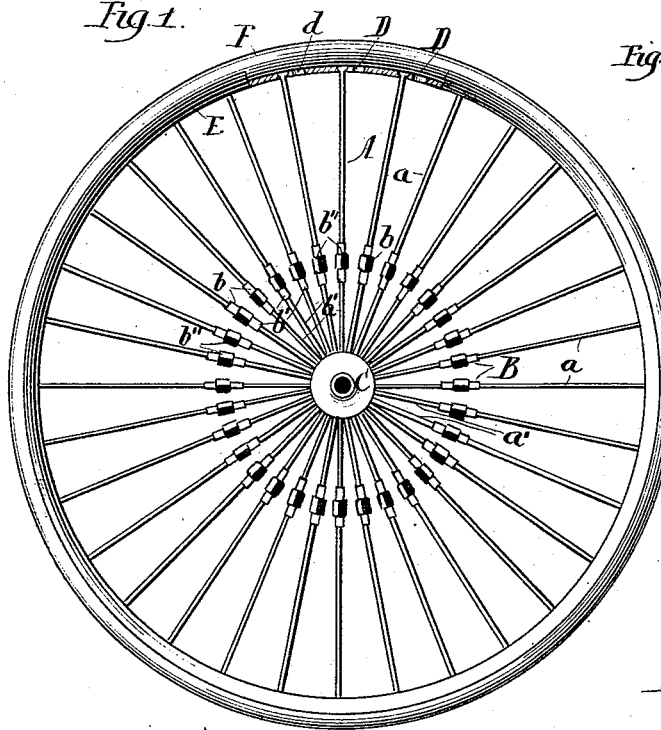
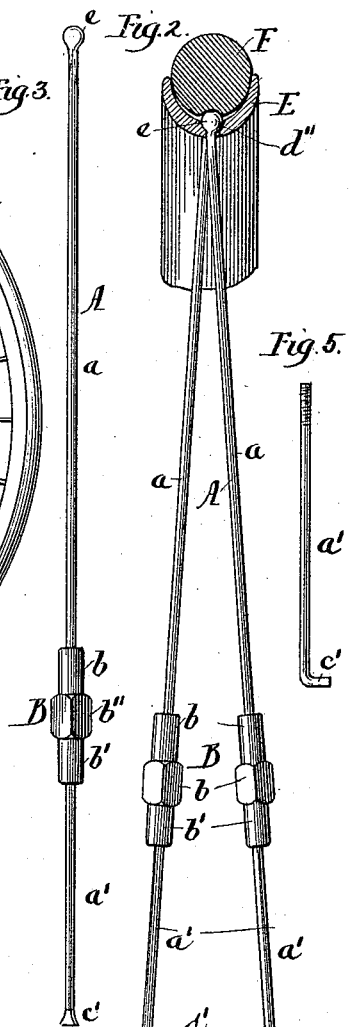
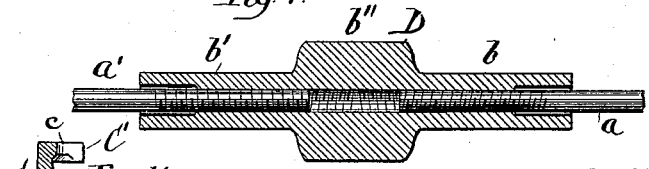
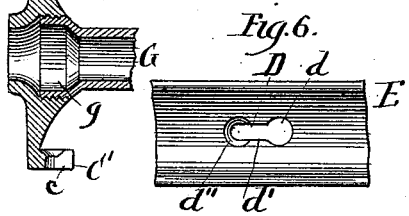
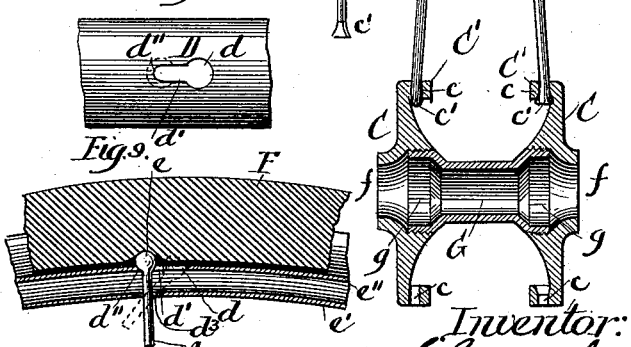
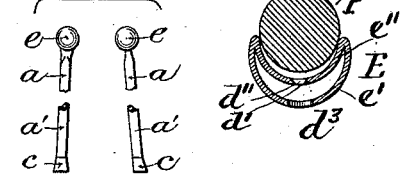
Witnesses:
Fred Gerlach
Lute S. Alter
Inventor:
Harry C Goodrich

UNITED STATES PATENT OFFICE.

HARRY C. GOODRICH, OF CHICAGO, ILLINOIS, ASSIGNOR TO LOUISA M. GOODRICH, OF SAME PLACE.

WHEEL.

SPECIFICATION forming part of Letters Patent No. 456,218, dated July 21, 1891.

Application filed March 2, 1891. Serial No. 383,489. (No model.)

*To all whom it may concern:*

Be it known that I, HARRY C. GOODRICH, a citizen of the United States, residing at the city of Chicago, in the county of Cook and State of Illinois, have invented certain new and useful Improvements in Wheels; and I do hereby declare that the following is a full, clear, and exact description of the invention, which will enable others skilled in the art to which it pertains to make and use the same, reference being had to the accompanying drawings, forming a part hereof, in which—

Figure 1 is a side elevation with the rim partly broken out to show the attachment of the spokes to the rim. Fig. 2 is a sectional elevation showing the attachment of the spokes to the hub and rim. Fig. 3 is an elevation showing the form of spoke. Fig. 4 is a detail in section showing the turn-buckle connection for the spokes. Fig. 5 is a detail of the hub-section of the spoke with the ends for attachment to the hub turned at right angles to the body. Fig. 6 is a detail showing the outer face of the rim. Fig. 7 is a detail showing the inner face of the rim. Fig. 8 is a detail in section longitudinally of the rim. Figs. 6, 7, and 8 show the construction of the hole for inserting the end of the spoke in the rim. Fig. 9 is a section longitudinally showing a rim with a double wall and the manner of inserting the spoke thereinto. Fig. 10 is a cross-section of the form of rim shown in Fig. 9. Fig. 11 is a section of a hub-disk, showing the spoke-attaching flange provided with slots or openings for inserting the spoke end. Fig. 12 is a detail showing a side view and an edge view of the flattened portion of the spoke at each end thereof.

This invention relates to wheels in which a light wire spoke is used, and is especially designed for bicycle-wheels, but can be used with other light wheels. An objection found in the use of wheels having light wire spokes is that the spokes break, and in order to replace them it is necessary with a continuous spoke to take down the wheel, and to obviate this difficulty divided spokes or spokes made in two sections have been designed; and this invention relates to the application of spokes made in two sections and the attachment of such spokes to the hub and rim, and its nature consists in the several parts and combination of parts hereinafter described, and pointed out in the claims as new.

In the drawings, A represents the spokes, each spoke formed of a section $a$ and a section $a'$.

B is a turn-buckle for uniting the spoke-sections $a$ and $a'$ to form a complete spoke, and this turn-buckle has an end $b$ with a screw-threaded hole to receive the screw-threaded end of the spoke-section $a$ and an end $b'$ with a screw-threaded hole to receive the screw-threaded end of the spoke-section $a'$ and a center $b''$, formed to receive a wrench or other instrument by which the turn-buckle can be operated to draw the two sections of the spoke together and make the spoke taut between the hub and the rim.

C are disks, one for each end of the hub, and each disk C has a peripheral flange C′, in which, as shown in Fig. 2, is a series of holes $c$ for the passage of the body of the spoke-section $a'$, and the end of the spoke-section has a head $c'$, as shown in Figs. 2 and 3, flattened on two sides, so as to have an engaging face or faces, which will prevent the turning of the spoke-section $a'$ with the turn-buckle B; or the end of the spoke-section can be turned at right angles, as shown in Fig. 5, to form a head $c'$ for engagement to prevent the turning of the spoke-section with the turn-buckle B.

D are holes in the rim of the wheel for inserting and retaining the rim end of the spoke, and each hole is formed of a round portion $d$ and a slot $d'$, forming a key-hole, and a countersink $d''$ on the concave or outer face of the rim, each countersink receiving a head $e$ of the spoke-section $a$, and in order to prevent turning the body of the spoke-section $a$ adjoining the head $e$ is flattened on opposite sides to form a face or faces for engaging with the edge or edges of the slot $d'$ and holding the spoke-section $a$ against turning with the operation of the turn-buckle B.

E is the rim of the wheel, which rim, as shown, has a concave outer face to receive a rubber tire, and, as shown in Figs. 1, 2, 6, 7, and 8, the rim is of a single piece, and the openings or holes D are in the rim, and as many holes D are to be provided as there are spokes in the wheel. As shown in Figs. 9 and 10, the wall is a double wall, and the outer wall has the holes or openings D similar to the holes D of the single-wall rim, and the inner wall has a hole $d'''$ of a larger diameter than the head $e$, so that the head can be passed through the hole $d'''$ and entered into the hole D, as shown by the dotted lines in Fig. 9.

F is a rubber tire secured to the rim E in the usual manner of attaching rubber tires to a wheel-rim.

G is the hub of the wheel, having at each end an enlarged portion $g$ to receive the disks C, and, as shown, each disk C on its outer face has an annular rim or flange $f$ to finish the head. The disks C, as shown in Fig. 2, have the holes $c$ for the spokes formed within the flange C', and as shown in Fig. 11 the holes for the spokes open to the edge of the flange, so that the end of the spoke can be slipped sidewise into position, while with the construction shown in Fig. 2 the spoke-sections are inserted endwise through the holes $c$.

The wheel is assembled by securing the disks C to the hub G, inserting the spoke-sections $a'$ into the holes $c$ therefor in the flange C' of the disks C, attaching the turn-buckle to the sections $a$ and $a'$ of the spoke A, inserting the head $e$ of each spoke-section $a$ into its hole D of the rim E for the head $e$ to lie in the countersink $d''$ therefor, drawing the spokes taut by operating the turn-buckle through a wrench or other instrument, and attaching the rubber tire F to the rim.

The replacement of a broken spoke is had by removing the turn-buckle, so that the sections of the broken spoke can be removed from the flange C' and from the rim E, inserting the section $a'$ of a new spoke into the flange C' and inserting the section $a$ of a new spoke into the rim E, attaching the turn-buckle B to the end of the spoke-sections $a$ and $a'$, and drawing the spoke taut. The spoke-section $a$ of a new spoke is inserted in the rim E to take the place of a broken spoke by slipping the head $e$ of the new spoke-section first into the hole $d$ for the head $e$ to lie within the interior of the rim and drawing the spoke into the slot $d'$ for the head $e$ to enter the countersink $d''$, and the spoke section $a'$ of the new spoke is inserted in the flange C' by passing the spoke-section endwise through the hole $c$ therefor when such hole is continuous, or inserting the end of the spoke-section sidewise into its hole $c$ when such hole opens to the outer edge of the flange C', and when the sections $a$ and $a'$ of the new spoke are in place the spoke can be drawn taut by the action of the turn-buckle B.

The removal of a broken spoke and the insertion of a new spoke can be had without tearing the wheel down or taking it to a shop for such repairing, as such removal and insertion can be done by the rider of a bicycle or by any one by simply removing the sections of the broken spokes and inserting the sections of a new spoke and then drawing the spoke taut by the turn-buckle, and in case it is desired not to replace the entire spoke a new section corresponding to the broken portion of the spoke can be inserted and the wheel repaired by the use of one section only of a new spoke, the section $a$, if broken, being repaired by inserting the head $e$ of a new section $a$ into the hole D, attaching the turn-buckle thereto and drawing the spoke taut, and the section $a'$ being replaced by inserting the new section $a'$ in the flange C, attaching the turn-buckle and drawing the spokes taut. The replacement of a broken spoke, it will thus be seen, can be readily accomplished and without the employment of any skilled labor, and when the spokes are in place and the rubber tire F is attached to the rim E the pressure of such tire will force and hold the heads $e$ in the countersinks $d''$ and prevent any displacement or slipping out of the head $e$ from the countersink, and when the spokes are in place the portions $d$ and $d'$ of the holes D can be filled with a cement that will harden, and the cement can also be used to fill the holes $c$ when open to the edge of the flange C', and this cement by filling the holes will present a more finished appearance for the rim and hub where the spokes are attached.

What I claim as new, and desire to secure by Letters Patent, is as follows:

1. The combination, in a wheel, of a series of spokes, each formed of two sections united by a turn-buckle, the outer section having at its rim end a head and a flat face adjacent to the head, a hub or disk for attachment of the hub ends of the spokes against turning, and a rim having a series of holes, each formed of a circular portion for entering the head of the rim end of the spoke and a slotted portion having a straight side face engaging and locking the flat face of the spoke adjacent to the head, for inserting and locking the rim ends of the spokes against turning, substantially as and for the purposes specified.

2. The spokes A, each formed of an outer section $a$, having at its rim end a head, with a flat face adjacent to the head, and an inner section $a'$, and turn-buckles B, uniting the spoke-sections $a$ and $a'$, in combination with the disk C, having the flanges C', with spoke-receiving holes $c$, into which the ends of the spokes enter and hold the spokes against turning with the rotation of the turn-buckle, and the rim E, having the spoke-receiving holes D, each formed of a circular portion passing the head of the rim end of the spoke and a slotted portion having a straight side face engaging and locking with the flat face of the spoke adjacent to the head, for removing and replacing broken spokes, substantially as specified.

3. The spokes A, each formed of an outer section $a$ and an inner section $a'$, the outer section having at its rim end a round head $e$, with a flat face on the body of the spoke adjacent to the head, and an inner section having a head $c'$, with a flat face, and the turnbuckle B, uniting the sections $a$ and $a'$ of the spoke, in combination with the hub-disks C, having holes $c$, receiving and locking the heads $c'$ of the spoke-sections A', and a rim E, having the holes D, each formed of a circular portion passing the head $e$ on the end of the spoke-section $a$ and a slotted portion having a straight side face engaging and locking the flat face of the spoke adjacent to the head $e$, for connecting the spokes to the hub and rim of a wheel and drawing the spokes taut, substantially as and for the purposes specified.

4. The spokes A, each formed of an outer section $a$ and an inner section $a'$, the outer section $a$ having at its rim end a round head $e$, with a flat face adjacent to the head, and an inner section having a head $c'$, with a locking-face, and turn-buckles B, uniting the two sections of the spokes, in combination with the disk C, having holes $c$, receiving and locking the head $c'$ of the spoke-sections $a'$, rim E, having the holes D, each formed of a circular portion passing the head $e$ of the spoke-section $a$ and a slotted portion having a straight side face engaging and locking with the flat face of the body of the spoke adjacent to the head, and rubber tire F, entering the rim E and pressing firmly against the round head $e$ and holding the heads in the locking-slots, substantially as and for the purposes specified.

HARRY C. GOODRICH.

Witnesses:
O. W. BOND,
JNO. C. MACGREGOR.